United States Patent [19]
Brunie et al.

[11] 3,914,292
[45] Oct. 21, 1975

[54] PROCESS FOR PREPARING ACYLOXY-ALKANALS FROM CYCLOALKYL HYDROPEROXIDE AND FORMIC ACID

[75] Inventors: Jean Claude Brunie, Francheville-le-Haut; Michel Costantini; Noel Crenne, both of Lyon; Michel Jouffret, Francheville-le-Bas, all of France

[73] Assignee: Rhone-Poulenc, S.A., Paris, France

[22] Filed: May 31, 1974

[21] Appl. No.: 475,028

[30] Foreign Application Priority Data
June 4, 1973  France .............................. 73.20227

[52] U.S. Cl. ...... 260/488 F; 260/488 R; 260/586 R; 260/635 A; 260/635 R
[51] Int. Cl.² .......................................... C07C 67/00
[58] Field of Search ................................ 260/488 F

[56] References Cited
UNITED STATES PATENTS

| | | | |
|---|---|---|---|
| 3,428,656 | 2/1969 | Weiss et al. | 260/488 F |
| 3,492,339 | 1/1970 | Hawkins et al. | 260/488 F |
| 3,590,080 | 6/1971 | Beesley et al. | 260/485 R |
| 3,689,534 | 9/1972 | Brunie et al. | 260/488 F |
| 3,784,567 | 1/1974 | Isard et al. | 260/488 F |

*Primary Examiner*—Vivian Garner
*Attorney, Agent, or Firm*—Stevens, Davis, Miller & Mosher

[57] ABSTRACT

ω-Formyloxy alkanals are prepared from the corresponding cycloalkyl hydroperoxide and formic acid in the presence of an anhydrous aprotic polar solvent which is a polymethylene-sulphone or an alkylene glycol carbonate, the alkylene portion containing 2 to 4 carbon atoms. The use of such solvents increases the yield of alkanal while reducing explosion hazards.

7 Claims, No Drawings

PROCESS FOR PREPARING ACYLOXY-ALKANALS FROM CYCLOALKYL HYDROPEROXIDE AND FORMIC ACID

This invention relates to a process for preparing acyloxy-alkanals from cycloalkyl hydroperoxide and formic acid.

ω-Formyloxy-alkanals of the general formula:

$$HC(O)O(CH_2)_nCHO \qquad (I)$$

in which the symbol n represents an integer from 5 to 11, have been described in U.S. Pat. No. 3689534. This specification also describes a process for their preparation which consists of reacting formic acid with a cycloalkyl hydroperoxide of the formula:

(II)

in which n is as defined above.

The hydroperoxides of formula (II) can be prepared from the corresponding cycloalkanols, or from the corresponding cycloalkanes by oxidation, in the liquid phase, without a catalyst, by means of a gas containing molecular oxygen. It is possible for example, to oxidise cyclohexane in accordance with the process described in French Pat. No. 1,404,723, and its higher homologues in accordance with the process described in French Pat. No. 1,429,569 and then to purify the hydroperoxide formed in accordance with conventional processes, such as conversion to the sodium salt and treatment with carbon dioxide.

The aforesaid United States Specification indicates that it is preferred to introduce pure hydroperoxide gradually into formic acid which does not contain more than 5% of water by weight and which has been heated beforehand to between 50°C and the boiling point.

The amount of formic acid employed is not critical since it can be used as the diluent; it is generally above 5 mols per mol of hydroperoxide.

When the introduction of the hydroperoxide is complete, it is advisable to remove the formic acid which has not taken part in the reaction from the reaction mixture because its presence can have a detrimental effect on the stability of the formyloxy-alkanal formed; azeotropic distillation is one method of achieving this result.

The formyloxy-alkanal formed can then be isolated from the residual mixture in accordance with the usual methods, for example by fractional distillation, preferably under reduced pressure.

The purification, handling and use of pure hydroperoxide for the splitting reaction with formic acid are operations which can present explosion hazards when performed on an industrial scale.

The purpose of the present invention is to provide an improved process for the preparation of ω-formyloxyalkanals from cycloalkyl hydroperoxides of the formula (II), in higher yield than in the process described above, while making it possible to eliminate or to reduce to a very large extent the difficulties mentioned above.

According to the present invention the splitting reaction employing formic acid and a said cycloalkyl hydroperoxide is carried out in the presence of an anhydrous aprotic polar solvent which is a polymethylene-sulphone or an alkylene glycol carbonate, the alkylene portion containing 2 to 4 carbon atoms.

Suitable polymethylene-sulphones which can be used in the process according to the present invention include those containing 3 to 6 methylene groups, one or more of said methylene groups optionally being substituted by alkyl radicals with 1 to 4 carbon atoms, for example, methyl, ethyl, propyl or butyl radicals.

Specific examples of suitable sulphones which may be used include trimethylene-sulphone, α-methyltrimethylenesulphone, α-methyltetramethylenesulphone, tetramethylenesulphone (sulpholane), pentamethylenesulphone, α-methylpentamethylenesulphone, hexamethylenesulphone and α,α'-dimethyltetramethylene-sulphone. Preferred polymethylenesulphones are sulpholane and its alkyl-substituted derivatives, such as those described in French Pat. No. 1,342,449, especially sulpholane itself.

Suitable glycol carbonates include ethylene glycol carbonate, propylene glycol carbonate and butane-2,3-diol carbonate.

Such solvents make it possible to split the hydroperoxides of formula (II) with better selectivity as regards the opening of the hydroperoxide rings, to form the corresponding ω-formyloxy-alkanals. It seems that these improved results are due simultaneously to the high dielectric constant of and to the low basicity of the solvents used, but it will be appreciated that the invention is in no way limited by this explanation of the role of the polymethylene-sulphones and the glycol carbonates. It has, however, been found that with a non-polar solvent such as toluene, or with a very basic solvent such as 1,2-dimethoxy-ethane or ethane-1,2-diol diformate, the reaction takes place preferentially towards the formation of cycloalkanones.

The general operating conditions of the process are essentially the same as those described in the United States Specification mentioned above to which reference should be made for further details. The cycloalkyl hydroperoxide is suitably introduced pure into a mixture of formic acid dissolved in the polar solvent heated beforehand to from 50°C to the reflux temperature of the mixture, however, for safety reasons, it is preferred to use the hydroperoxide in the form of a solution in a suitable solvent. For example, the hydroperoxide can be employed in the form of a solution in sulpholane, ethylene glycol carbonate or propylene glycol carbonate, and this solution can be introduced into the formic acid which has been heated beforehand to from 50°C to the boiling point, optionally dissolved in the solvent used. For reasons of convenience, the solution of hydroperoxide employed is advantageously the solution resulting from the extraction of the cycloalkyl hydroperoxide from the crude oxidised products of the hydrocarbon from which it is derived, using the above-mentioned polar solvents; this extraction process is described in application Ser. No. 475,042 of Billet and Jouffret, filed simultaneously herewith.

It is also possible to use the hydroperoxide dissolved in the hydrocarbon from which it is derived by oxidation; for example, the crude solution resulting from the oxidation, containing the hydroperoxide, can be used directly and this solution can be introduced gradually into the mixture of formic acid and the selected polar solvent, heated beforehand to the desired temperature.

| Solvent | Example 1 Sulpholane | Example 2 Sulpholane | Example 3 Ethylene glycol carbonate | Experiment A Toluene | Experiment B Dimethoxy-ethane | Experiment C Ethane-1,2-diol diformate |
|---|---|---|---|---|---|---|
| grams | 82.7 | 17.5 | 18 | 22.3 | 25 | 9.2 |
| Pure formic acid, mols | 1.8 | 0.355 | 0.4 | 0.351 | 0.346 | 0.196 |
| Pure cyclohexyl hydroperoxide mol | 0.149 | 0.013 | 0.034 | 0.045 | 0.053 | 0.0094 |
| Molar ratio: Formic acid Hydroperoxide | 12 | 27 | 11.7 | 7.8 | 6.6 | 20.9 |
| Weight ratio: Formic acid + hydroperoxide solvent | 1.2 | 1.02 | 1.24 | 0.96 | 0.88 | 1.1 |
| Temperature, °C. | 120° | 120° | 120° | 88° | 105° | 118° |
| Duration in minutes | 4 | 1 | 2 | 15 | 40 | 2 |
| Yield of 6-formyloxy-hexanal | 49% | 54% | 53.8% | 8% | 3.2% | 11% |
| Yield of cyclohexanone | 24.8% | 30% | — | 51.5% | 57.5% | 58% |
| Yield of cyclohexyl formate | 8.5% | 7.6% | 10.7% | 12.5% | 18.8% | 11.7% |
| Total yield | 82.3% | 91.6% | 64.5% | 72% | 79.5% | 80.7% |

The concentration of the reagents, namely the hydroperoxide and formic acid, in the selected polar solvent is not critical; for example, from 10 g to 150 g. of both reagents may be used per 100 g. of solvent, although these are by no means absolute limits.

When the introduction of the hydroperoxide is complete, the reaction mixture resulting from the splitting process can be treated in various ways. Thus it is possible to isolate the ω-formyloxy-alkanals which are very valuable synthesis intermediates, for example in the production of α,ω-alkane-diols and ω-hydroxy carboxylic acid, but it is equally possible to treat the crude reaction mixture directly so as to convert these difunctional compounds in situ to industrially valuable products. It is thus possible, for example, to convert them to α,ω-alkanediols by reduction of the aldehyde group followed by saponification of the ester group, it being possible to carry out these operations either on isolated products or on the reaction mixtures containing them.

The following Examples further illustrate the present invention; Examples A to C are included by way of comparison.

EXAMPLES 1 to 3

In a flask equipped with a stirring system, formic acid (the water content of which is 1.7% by weight), to which anhydrous sulpholane (Examples 1 and 2), ethylene glycol carbonate (Example 3), anhydrous toluene (Experiment A), anhydrous 1,2-dimethoxy-ethane (Experiment B) or anhydrous ethane-1,2-diol diformate (Experiment C) have been added, is heated to the desired temperature which is generally the boiling point of the mixture. 97% pure cyclohexyl hydroperoxide is then added as rapidly as possible to the mixture which is kept at the selected temperature for a specified period of time until complete deperoxidation has taken place. At the end of this period of time, the yields of formyloxy-hexanal, cyclohexanone and cyclohexyl formate, relative to the pure cyclohexyl hydroperoxide introduced are measured by vapour phase chromatographic analyses.

The working conditions and the results obtained are given in the following Table.

We claim:

1. In a process for the preparation of an ω-formyloxy-alkanal of the general formula:

in which $n$ represents an integer from 5 to 11, which comprises reacting formic acid with a cycloalkyl hydroperoxide of the formula:

in which $n$ is as defined above, the improvement wherein the reaction is carried out in the presence of an anhydrous aprotic polar solvent selected from a polymethylene-sulphone possessing 3 to 6 methylene groups wherein one or more of said methylene groups may be substituted by an alkyl radical with 1 to 4 carbon atoms, or an alkylene glycol carbonate, the alkylene portion containing 2 to 4 carbon atoms.

2. Process according to claim 1 in which the solvent is sulpholane, ethylene glycol carbonate or propylene glycol carbonate.

3. Process according to claim 1 in which the reaction is carried out in the liquid phase at a temperature of from 50°C to the boiling point of the reaction mixture.

4. Process according to claim 1 in which the formic acid is used in an amount greater than 5 mols per mol of hydroperoxide.

5. Process according to claim 1 in which the formic acid and the hydroperoxide are used in an amount from 10 g. to 150 g. of both reagents per 100 g of solvent.

6. Process according to claim 1 wherein the hydroperoxide is provided in the form of a solution in the said solvent, the solution having been obtained by extracting the hydroperoxide from a reaction mixture containing it by the said solvent.

7. Process for preparing ω-formyloxy-hexanal which comprises reacting cyclohexyl hydroperoxide with formic acid in the presence of a solvent selected from sulpholane and ethylene glycol carbonate, 10 g to 150 g of the peroxide and the formic acid being used per 100 g of solvent.

* * * * *